United States Patent
Pichler et al.

(10) Patent No.: US 11,206,058 B2
(45) Date of Patent: Dec. 21, 2021

(54) CLOCK RECOVERY IN AN RFID TRANSPONDER

(71) Applicant: NXP B.V., Eindhoven (NL)

(72) Inventors: Thomas Pichler, Graz (AT); Ivan Jesus Rebollo Pimentel, Graz (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 17/024,055

(22) Filed: Sep. 17, 2020

(65) Prior Publication Data

US 2021/0111758 A1 Apr. 15, 2021

(30) Foreign Application Priority Data

Oct. 15, 2019 (EP) .................................. 19203260

(51) Int. Cl.
*H04B 5/00* (2006.01)
*G06K 19/07* (2006.01)

(52) U.S. Cl.
CPC ........ *H04B 5/0031* (2013.01); *G06K 19/0723* (2013.01); *H04B 5/0062* (2013.01)

(58) Field of Classification Search
CPC ........ H04B 5/00–02; G06K 19/0723–19/0727
See application file for complete search history.

(56) References Cited

U.S. PATENT DOCUMENTS

| | | | |
|---|---|---|---|
| 7,027,786 B1 | 4/2006 | Smith et al. | |
| 7,212,580 B2 | 5/2007 | Hietala et al. | |
| 7,940,073 B1 * | 5/2011 | Stewart | G06F 21/35 326/8 |
| 2008/0252418 A1 | 10/2008 | Klapf et al. | |
| 2010/0085158 A1 * | 4/2010 | Amtmann | G06K 7/0008 340/10.1 |
| 2011/0122718 A1 * | 5/2011 | Stewart | G11C 29/006 365/201 |
| 2014/0030986 A1 * | 1/2014 | Caruana | G06K 19/07773 455/75 |

FOREIGN PATENT DOCUMENTS

| | | | |
|---|---|---|---|
| BR | 102015002248 A2 * | 8/2016 | |
| CN | 101038617 B | 7/2010 | |
| EP | 1986136 A1 | 10/2008 | |
| EP | 2535838 A1 | 12/2012 | |
| JP | 2011082954 A | 4/2011 | |

* cited by examiner

*Primary Examiner* — Gennadiy Tsvey

(57) ABSTRACT

In accordance with a first aspect of the present disclosure, a radio frequency identification (RFID) transponder is provided, comprising a modulator, a current sensor and a clock recovery circuit, wherein: the modulator is configured to modulate an unmodulated carrier signal received from an external RFID reader; the current sensor is configured to sense a current that flows through one or more transistors comprised in the modulator; and the clock recovery circuit is configured to recover a clock signal using the current sensed by the current sensor. In accordance with a second aspect of the present disclosure, a corresponding method of operating a radio frequency identification (RFID) transponder is conceived.

15 Claims, 6 Drawing Sheets

CLOCK RECOVERY IN AN RFID TRANSPONDER

CROSS-REFERENCE TO RELATED APPLICATIONS

This application claims priority under 35 U.S.C. § 119 to European Patent Application No. 19203260.5, filed on Oct. 15, 2019, the contents of which are incorporated by reference herein.

TECHNICAL FIELD

The present disclosure relates to a radio frequency identification (RFID) transponder. Furthermore, the present disclosure relates to a corresponding method of operating an RFID transponder.

BACKGROUND

Nowadays, radio frequency identification (RFID) transponders are widely used, in different areas of industry and commerce and for various purposes. RFID transponders may for example be embodied as so-called RFID tags or RFID cards. It is noted that, in the present disclosure, near field communication (NFC) transponders are regarded as a specific type of RFID transponders. Thus, the principles described herein may also be applied to NFC transponders.

SUMMARY

In accordance with a first aspect of the present disclosure, a radio frequency identification (RFID) transponder is provided, comprising a modulator, a current sensor and a clock recovery circuit, wherein: the modulator is configured to modulate an unmodulated carrier signal received from an external RFID reader; the current sensor is configured to sense a current that flows through one or more transistors comprised in the modulator; and the clock recovery circuit is configured to recover a clock signal using the current sensed by the current sensor.

In one or more embodiments, the clock recovery circuit is configured to use said current for recovering the clock signal when the modulator carries out a modulation of the carrier signal.

In one or more embodiments, the clock recovery circuit is configured to use the carrier signal for recovering the clock signal when the modulator does not carry out a modulation of the carrier signal.

In one or more embodiments, the current sensor is configured to sense the current in a modulation path of the RFID transponder.

In one or more embodiments, the current sensor is configured to sense the current in a path that is parallel to a modulation path of the RFID transponder.

In one or more embodiments, the RFID transponder further comprises a controller, said controller being configured to connect and disconnect an output of the current sensor to the clock recovery circuit using a first controllable switch.

In one or more embodiments, the controller is further configured to connect and disconnect an antenna terminal to the clock recovery circuit using a second controllable switch.

In one or more embodiments, the controller is configured to connect the output of the current sensor to the clock recovery circuit and to disconnect the antenna terminal from the clock recovery circuit when the modulator carries out a modulation of the carrier signal.

In one or more embodiments, the controller is configured to connect the antenna terminal to the clock recovery circuit and to disconnect the output of the current sensor from the clock recovery circuit when the modulator does not carry out a modulation of the carrier signal.

In accordance with a second aspect of the present disclosure, a method of operating a radio frequency identification (RFID) transponder is conceived, the RFID transponder comprising a modulator, a current sensor and a clock recovery circuit, the method comprising: modulating, by the modulator, an unmodulated carrier signal received from an external RFID reader; sensing, by the current sensor, a current that flows through one or more transistors comprised in the modulator; and recovering, by the clock recovery circuit, a clock signal using the current sensed by the current sensor.

In one or more embodiments, the clock recovery circuit uses said current for recovering the clock signal when the modulator carries out a modulation of the carrier signal.

In one or more embodiments, the clock recovery circuit uses the carrier signal for recovering the clock signal when the modulator does not carry out a modulation of the carrier signal.

In one or more embodiments, the current sensor senses the current in a modulation path of the RFID transponder.

In one or more embodiments, the current sensor senses the current in a path that is parallel to a modulation path of the RFID transponder.

DESCRIPTION OF DRAWINGS

Embodiments will be described in more detail with reference to the appended drawings, in which.

DESCRIPTION OF EMBODIMENTS

Nowadays, radio frequency identification (RFID) transponders are widely used, in different areas of industry and commerce and for various purposes. RFID transponders may for example be embodied as so-called RFID tags or RFID cards. It is noted that, in the present disclosure, near field communication (NFC) transponders are regarded as a specific type of RFID transponders. Thus, the principles described herein may also be applied to NFC transponders.

RFID communication may be based on inductive coupling. The communication between an RFID reader and an RFID transponder, such as an RFID tag, is often realized by means of load modulation and can be split into a forward link and a return link. More specifically, the RFID reader may transmit commands to the RFID transponder through a forward link, and the RFID transponder may transmit responses to those commands back to the RFID reader through a return link. The RFID transponder contains a modulator, which load modulates a carrier signal. Different types of load modulation exist, for example active load modulation (ALM) and passive load modulation (PLM). The return link may also be referred to as a backscatter signal or more concisely as "backscatter".

RFID transponders of the kind set forth need a clock signal for operating properly. This clock signal is recovered from the carrier signal. Optionally, the recovered signal may be locked by means of a phase-locked loop (PLL). During strong modulation the clock recovery does not function properly, because no carrier amplitude is left. If no PLL is used, RFID transponders typically limit the residual carrier to ensure a proper operation of the clock recovery circuit during modulation, in particular by limiting the modulation strength. This has a strong impact on the strength of the return link, because it is not possible to use the whole voltage swing. If a PLL is used, RFID transponders inherently limit their operating range due to the large current consumption resulting from the use of the PLL. Now discussed are an RFID transponder and a corresponding method of operating an RFID transponder, which facilitate increasing the strength of the return link.

Figure 1:
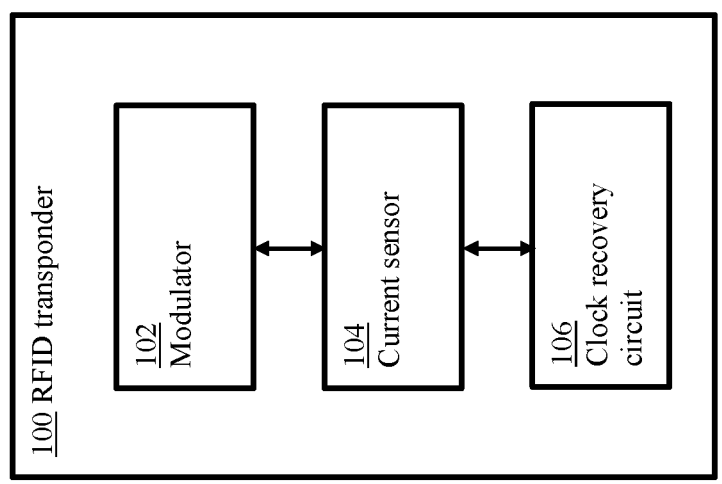
FIG. 1 shows an illustrative embodiment of an RFID transponder.

FIG. 1 shows an illustrative embodiment of an RFID transponder 100. The RFID transponder 100 includes a modulator 102, a current sensor 104 which is operatively coupled to the modulator 102, and a clock recovery circuit 106 which is operatively coupled to the current sensor 104. The modulator 102 is configured to modulate an unmodulated carrier signal received from an external RFID reader (not shown), i.e. an RFID reader that is external to the RFID transponder 100. For this purpose, the modulator is controlled by an external controller (not shown). Furthermore, the current sensor 104 is configured to sense a current that flows through one or more transistors comprised in the modulator 102. Furthermore, the clock recovery circuit 106 is configured to recover a clock signal using the current sensed by the current sensor 104. By using the sensed current to recover the clock signal, instead or in addition to the input voltage (i.e., the carrier signal itself), the clock signal can be recovered also if said input voltage is too low for a proper recovery, for example during modulation. Thus, the modulation strength does not need to be limited to ensure that the input voltage remains sufficiently high for a proper clock recovery. This, in turn, results in a higher strength of the return link.

Figure 2:
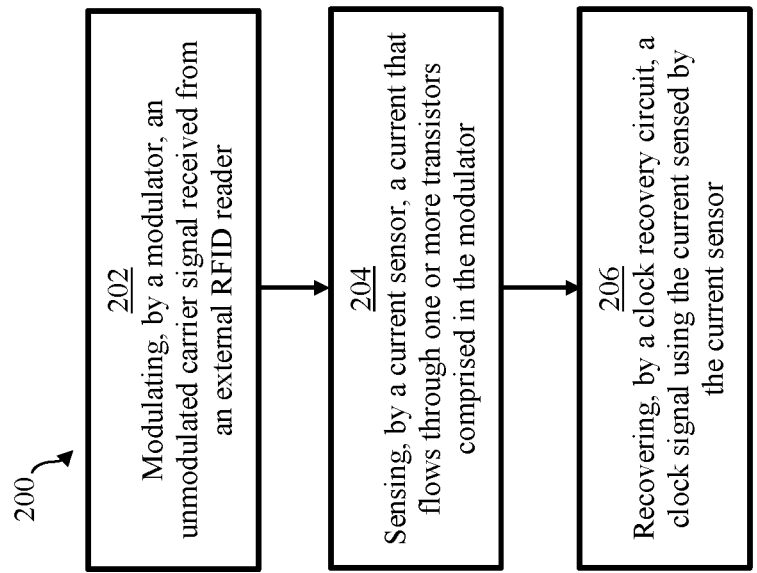
FIG. 2 shows an illustrative embodiment of a method of operating an RFID transponder.

FIG. 2 shows an illustrative embodiment of a method 200 of operating an RFID transponder. The method 200 comprises, at 202, modulating, by a modulator, an unmodulated carrier signal received from an external RFID reader. Furthermore, the method 200 comprises, at 204, sensing, by a current sensor, a current that flows through one or more transistors comprised in the modulator. Furthermore, the method 200 comprises, at 206, recovering, by a clock recovery circuit, a clock signal using the current sensed by the current sensor. As explained above, in this way, a higher strength of the return link can be achieved.

In one or more embodiments, the clock recovery circuit is configured to use the sensed current for recovering the clock signal when the modulator carries out a modulation of the carrier signal. In other words, the sensed current is used for clock recovery during modulation. During modulation, the input voltage (i.e., the voltage derived from the carrier signal) is often too low for a proper clock recovery. By using the sensed current instead, a proper clock recovery can also be achieved during modulation. In one or more embodiments, the clock recovery circuit is configured to use the carrier signal for recovering the clock signal when the modulator does not carry out a modulation of the carrier signal. If no modulation takes place, the current flowing through the modulator will be minimal. Therefore, the input voltage is used for recovering the clock, to achieve a stable clock recovery. It is noted that using the carrier signal refers in this context to using the input voltage derived from this carrier signal, or, in other words, the input voltage derived from the field generated by the external RFID reader.

Figure 3:
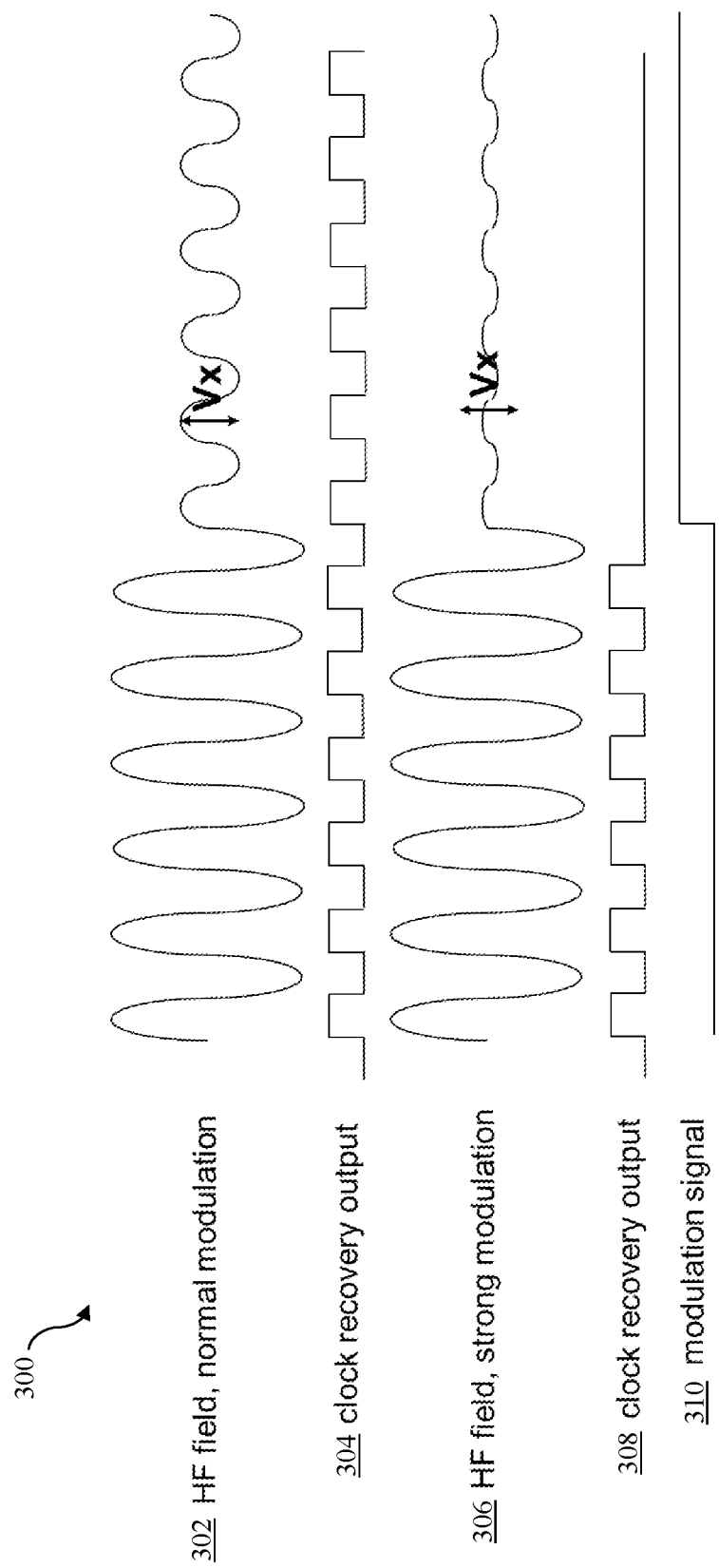
FIG. 3 shows an example of a signal timing diagram.

FIG. 3 shows an example of a signal timing diagram 300. RFID transponders typically use a clock recovery circuit and/or a PLL for generating a system clock. The clock recovery circuit needs a sufficiently high amplitude of the high-frequency carrier signal to properly recover the clock signal. As explained above, without using a PLL, this limits the modulation strength and therefore also the strength of the return link signal. In particular, RFID transponders with a clock recovery circuit use the input voltage to recover the clock signal. Therefore, a certain voltage level Vx is needed to successfully recover the clock. If, for example during modulation, this voltage level Vx is undershot, then the clock recovery will fail at least partially. It is noted that this input voltage is also referred to as the residual carrier. Thus, the system should guarantee that the residual carrier is above Vx. This leads to a worse performance in the sense that the strength of the return link will be limited. In FIG. 3 it can be seen that the residual carrier Vx is sufficiently high for a proper clock recovery in case of a normal modulation 302, but that the residual carrier Vx is not high enough for a proper clock recovery in case of a strong modulation 306. In the former case, the clock recovery output 304 reflects that the clock signal is properly recovered, while in the latter case, the clock recovery output 308 reflects that the clock is not properly recovered when the carrier signal is being modulated (i.e., when the modulation signal 310 is high).

Figure 4:
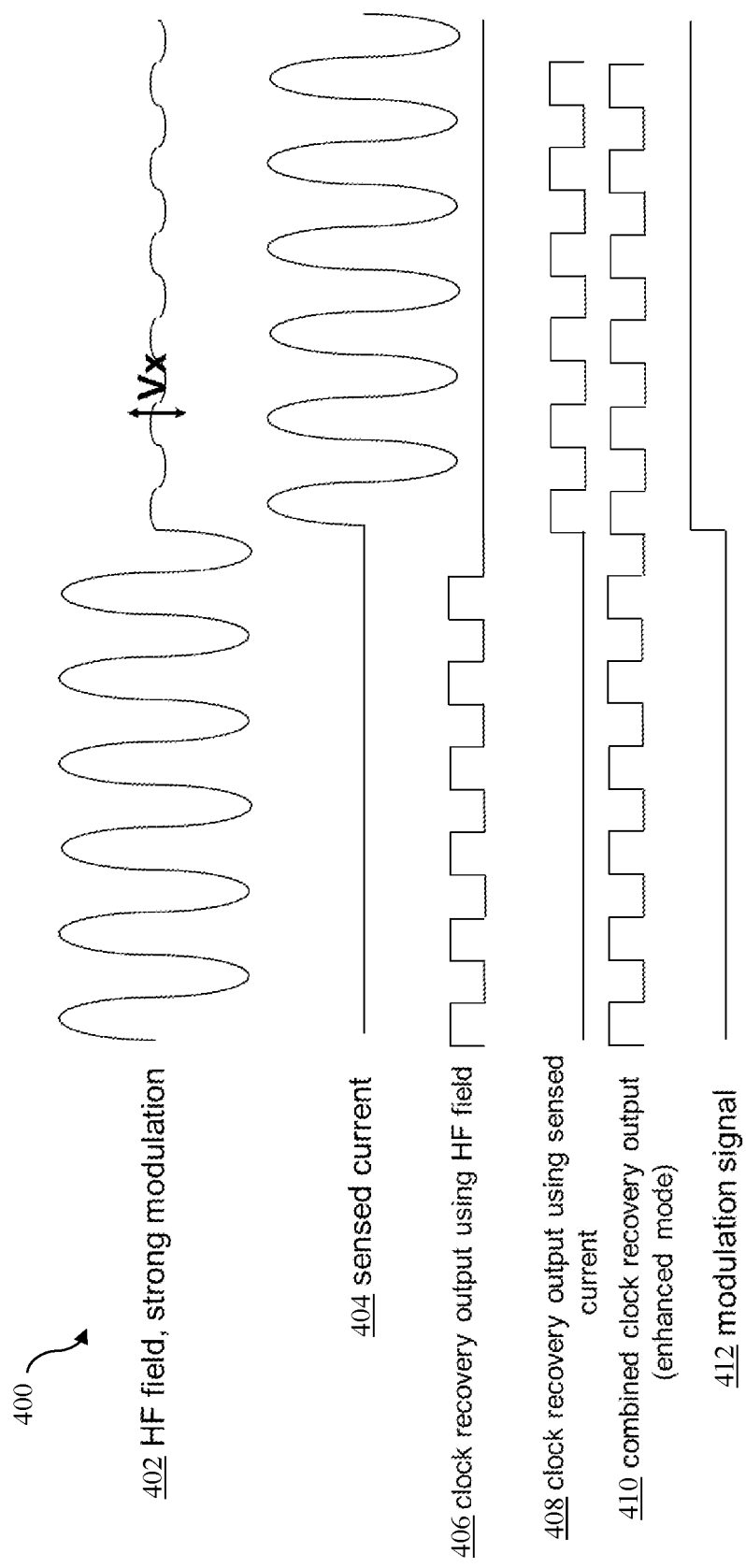
FIG. 4 shows an illustrative embodiment of a signal timing diagram.

FIG. 4 shows an illustrative embodiment of a signal timing diagram 400. To ensure a stable clock recovery, the current flowing through the modulator is sensed during modulation. This current has the same shape as the residual carrier and can thus be used for recovering the clock. As a result, the clock recovery circuit does not need to rely on the residual carrier during modulation, so that the residual carrier does not need to have a minimum strength. The current sensing can be implemented using different circuit topologies. In FIG. 4, although the residual carrier Vx is not sufficiently high for a proper clock recovery in case of a strong modulation 402 (see the clock recovery output using the HF field 406), the clock can still be properly recovered if the sensed current 404 is used (see the clock recovery output using the sensed current 408). In an enhanced mode, the HF field (input voltage) is used during non-modulation, and the sensed current is used during modulation. This results in a stable, combined clock recovery output 410.

Figure 5:
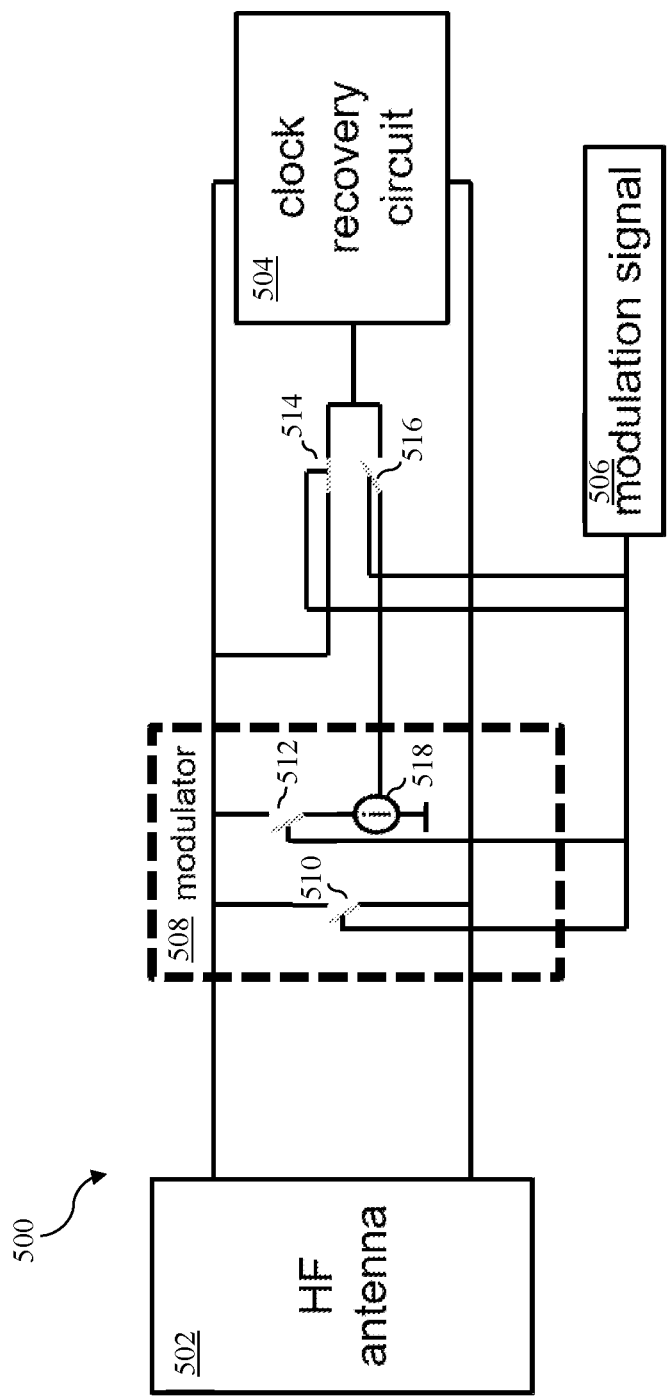
FIG. 5 shows another illustrative embodiment of an RFID transponder.

FIG. 5 shows another illustrative embodiment of an RFID transponder 500. The RFID transponder 500 includes a high-frequency (HF) antenna 502, a clock recovery circuit 504, and a modulator 508 that is controlled by means of a modulation signal 506. The modulation signal 506 may be provided by a controller included in the RFID transponder (not shown). To control the modulation process, the modulation signal 506 is provided to a modulation switch 510. For implementing the current measurement, one approach could be to use a parallel path as current divider, having a certain ratio. For this purpose, two or more modulation transistors may be provided in parallel or in another configuration. Thus, in a practical and effective implementation, a current sensor 518 is configured to sense the current in a path that is parallel to a modulation path of the RFID transponder. However, it is noted that other implementations are possible too. In particular, the following implementations are possible: a parallel path with a switch, a serial path without a switch, a parallel path without a switch, a serial path with a switch. FIG. 5 shows a parallel path with a switch. Alternatively, a parallel path may be used that does not contain a switch (not shown). In that case, the switch 512 will not be present.

Furthermore, in a practical and effective implementation, the RFID transponder further comprises a controller, said controller being configured to connect and disconnect an output of the current sensor 518 to the clock recovery circuit by means of a first controllable switch. Controllable switch 516 shown in FIG. 5 is an example of the first controllable switch. Furthermore, in a practical and effective implementation, the controller is configured to connect and disconnect an antenna terminal to the clock recovery circuit by means of a second controllable switch. Controllable switch 514 shown in FIG. 5 is an example of the second controllable switch.

By means of the first and second controllable switches, the sensed current and the residual carrier can be fed to the clock recovery circuit 504 in an alternating manner. Thus, in this way, the correct input can easily be provided to the clock recovery circuit 504. Furthermore, the modulation signal 506 could be used to control said first and second controllable switches. In this way, the sensed current may be fed nearly immediately to the clock recovery circuit 504 when the modulation starts, and the residual carrier may be fed nearly immediately to the clock recovery circuit 504 when the modulation stops.

Thus, in a practical and effective implementation, the controller is configured to connect the output of the current sensor 518 to the clock recovery circuit 504 and to disconnect the antenna terminals from the clock recovery circuit 504 when the modulator carries out a modulation of the carrier signal. Furthermore, in a practical and effective implementation, the controller is configured to connect the antenna terminal to the clock recovery circuit and to disconnect the output of the current sensor 518 from the clock recovery circuit when the modulator does not carry out a modulation of the carrier signal.

Figure 6:
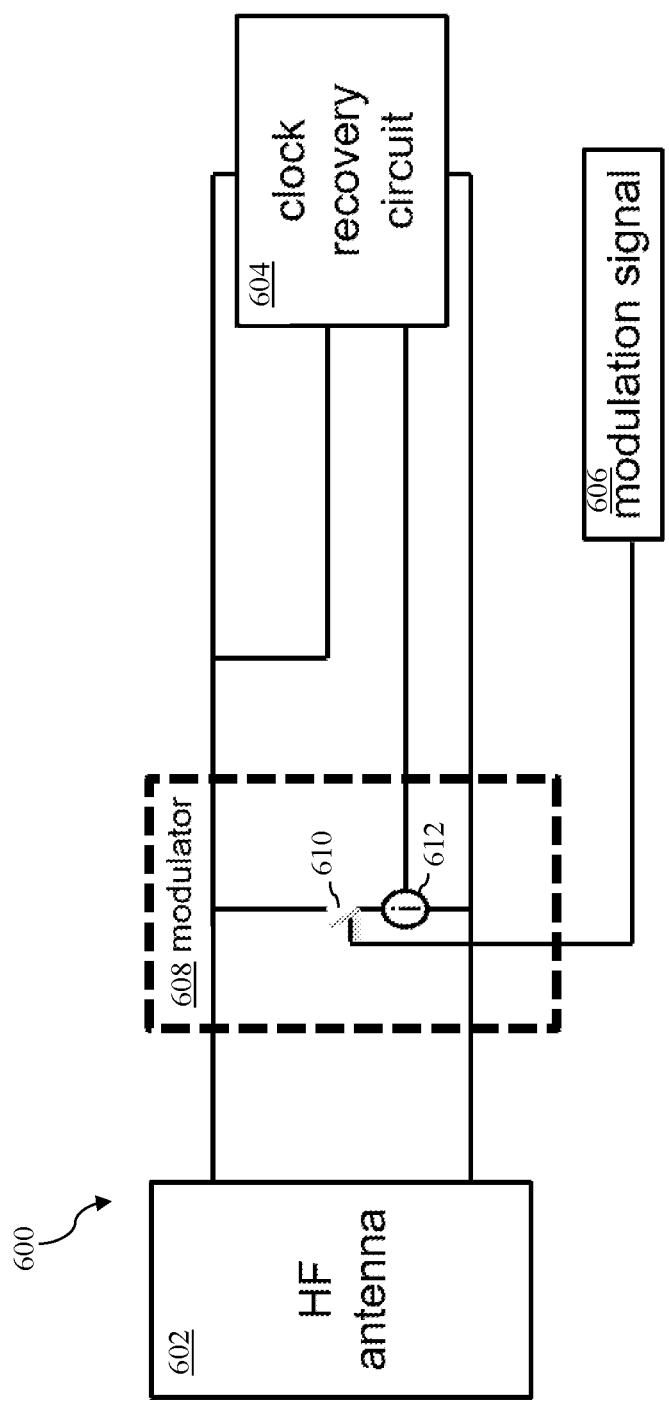
FIG. 6 shows a further illustrative embodiment of an RFID transponder.

FIG. 6 shows a further illustrative embodiment of an RFID transponder 600. The RFID transponder 600 includes a high-frequency (HF) antenna 602, a clock recovery circuit 604, and a modulator 608 that is controlled by means of a modulation signal 606. The modulation signal 606 may be provided by a controller included in the RFID transponder (not shown). To control the modulation process, the modulation signal 606 is provided to a modulation switch 610. In this practical and effective implementation, a current sensor 612 is configured to sense the current in a modulation path of the RFID transponder. This implementation has the advantage that no switching of the signals is required. It is noted that FIG. 6 shows an implementation based on a serial path without a switch (i.e., having no switch in addition to the modulation switch 610).

Figure 7:
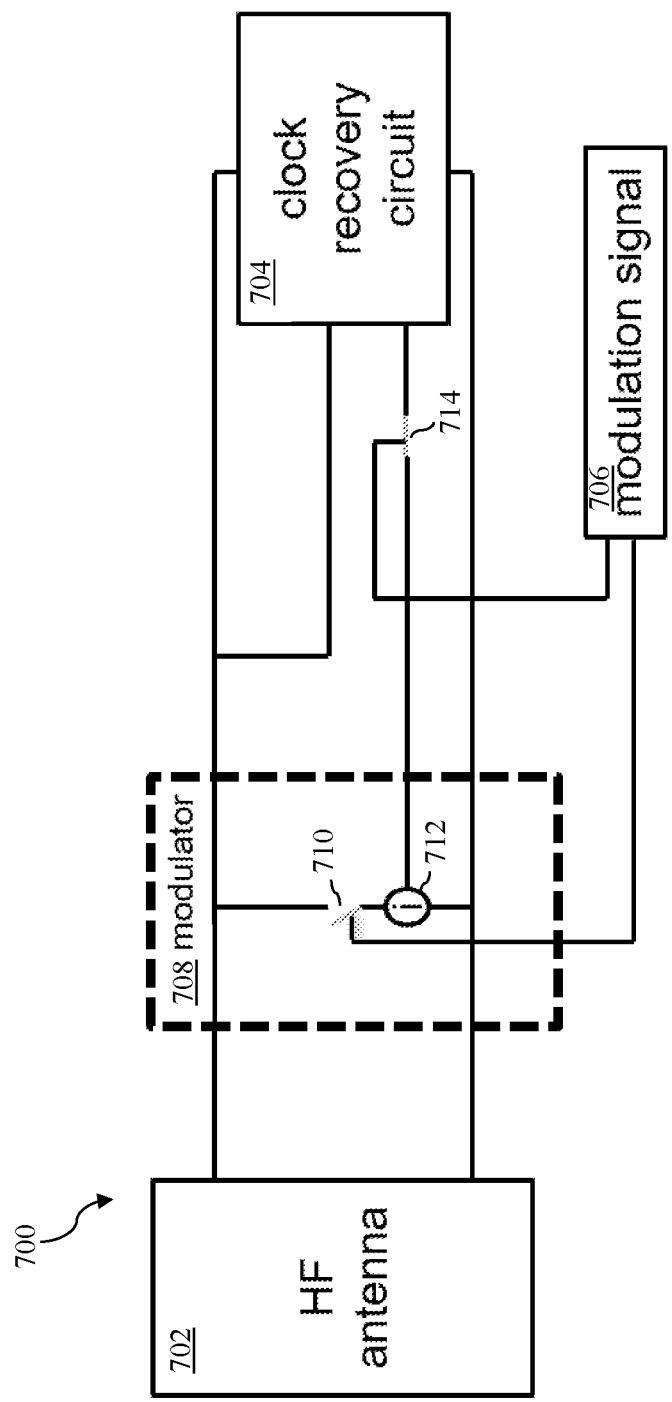
FIG. 7 shows a further illustrative embodiment of an RFID transponder.

FIG. 7 shows a further illustrative embodiment of an RFID transponder 700. The RFID transponder 700 includes a high-frequency (HF) antenna 702, a clock recovery circuit 704, and a modulator 708 that is controlled by means of a modulation signal 706. The modulation signal 706 may be provided by a controller included in the RFID transponder (not shown). To control the modulation process, the modulation signal 706 is provided to a modulation switch 710. In this practical and effective implementation, a current sensor 712 is configured to sense the current in a modulation path of the RFID transponder. It is noted that FIG. 7 shows an implementation based on a serial path with an additional controllable switch 714.

It is noted that different implementations of an RFID transponder are possible. For instance, single ended implementations and differential implementations may be envisaged for connecting the antenna to the clock recovery circuit. It is noted that the principle of recovering the clock signal using the current sensed by the current sensor can be applied to these different implementations. Furthermore, recovering the clock signal using the current may be implemented in various ways. More specifically, the current sensor data may be converted and input to the clock recovery circuit in various ways, for example by means of a simple current mirror, logarithmic amplifiers, transimpedance amplifiers and other amplifiers.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS

100 RFID transponder
102 modulator 104 current sensor
106 clock recovery circuit
200 method of operating an RFID transponder
202 modulating, by a modulator, an unmodulated carrier signal received from an external RFID reader
204 sensing, by a current sensor, a current that flows through one or more transistors comprised in the modulator
206 recovering, by a clock recovery circuit, a clock signal using the current sensed by the current sensor
300 signal timing diagram
302 HF field, normal modulation
304 clock recovery output
306 HF field, strong modulation
308 clock recovery output
310 modulation signal
400 signal timing diagram
402 HF field, strong modulation
404 sensed current
406 clock recovery output using HF field
408 clock recovery output using sensed current
410 combined clock recovery output (enhanced mode)
412 modulation signal
500 RFID transponder
502 HF antenna
504 clock recovery circuit
506 modulation signal
508 modulator
510 controllable switch
512 controllable switch
514 controllable switch
516 controllable switch
518 current sensor
600 RFID transponder
602 HF antenna
604 clock recovery circuit
606 modulation signal
608 modulator
610 controllable switch
612 current sensor
700 RFID transponder
702 HF antenna
704 clock recovery circuit
706 modulation signal
708 modulator
710 controllable switch
712 current sensor
714 controllable switch

The invention claimed is:

1. A radio frequency identification, RFID, transponder, comprising a modulator, a current sensor, a controller, and a clock recovery circuit, wherein:
   the modulator is configured to modulate an unmodulated carrier signal received from an external RFID reader;
   the current sensor is configured to sense a current that flows through one or more transistors comprised in the modulator;
   the controller configured to connect and disconnect an output of the current sensor to the clock recovery circuit using a first controllable switch, wherein the controller is configured to connect the output of the current sensor to the clock recovery circuit and to disconnect an antenna terminal from the clock recovery circuit when the modulator carries out a modulation of the carrier signal; and
   the clock recovery circuit is configured to recover a clock signal using the current sensed by the current sensor.

2. The RFID transponder of claim 1, wherein the clock recovery circuit is configured to use said current for recovering the clock signal when the modulator carries out a modulation of the carrier signal.

3. The RFID transponder of claim 1, wherein the clock recovery circuit is configured to use the carrier signal for recovering the clock signal when the modulator does not carry out a modulation of the carrier signal.

4. The RFID transponder of claim 1, wherein the current sensor is configured to sense the current in a modulation path of the RFID transponder.

5. The RFID transponder of claim 1, wherein the current sensor is configured to sense the current in a path that is parallel to a modulation path of the RFID transponder.

6. The RFID transponder of claim 1, wherein the controller is further configured to connect and disconnect an antenna terminal to the clock recovery circuit using a second controllable switch.

7. The RFID transponder of claim 1, wherein the controller is configured to connect the antenna terminal to the clock recovery circuit and to disconnect the output of the current sensor from the clock recovery circuit when the modulator does not carry out a modulation of the carrier signal.

8. A method of operating a radio frequency identification, RFID, transponder, the RFID transponder comprising a modulator, a current sensor, a controller, and a clock recovery circuit, the method comprising:
   modulating, by the modulator, an unmodulated carrier signal received from an external RFID reader;
   sensing, by the current sensor, a current that flows through one or more transistors comprised in the modulator;
   connecting and disconnecting, by the controller, an output of the current sensor to the clock recovery circuit using a first controllable switch, wherein the controller connects the output of the current sensor to the clock recovery circuit and disconnects an antenna terminal from the clock recovery circuit when the modulator carries out a modulation of the carrier signal; and
   recovering, by the clock recovery circuit, a clock signal using the current sensed by the current sensor.

9. The method of claim 8, wherein the clock recovery circuit uses said current for recovering the clock signal when the modulator carries out a modulation of the carrier signal.

10. The method of claim 8, wherein the clock recovery circuit uses the carrier signal for recovering the clock signal when the modulator does not carry out a modulation of the carrier signal.

11. The method of claim 8, wherein the current sensor senses the current in a modulation path of the RFID transponder.

12. The method of claim 8, wherein the current sensor senses the current in a path that is parallel to a modulation path of the RFID transponder.

13. The method of claim 8, wherein the controller connects and disconnects an antenna terminal to the clock recovery circuit using a second controllable switch.

14. The method of claim 8, wherein the controller connects the antenna terminal to the clock recovery circuit and disconnects the output of the current sensor from the clock recovery circuit when the modulator does not carry out a modulation of the carrier signal.

15. The method of claim 8, wherein the method is implemented with executable instructions stored in a non-transitory machine-readable medium.

* * * * *